US012688864B2

(12) United States Patent
Rajauria et al.

(10) Patent No.: US 12,688,864 B2
(45) Date of Patent: Jul. 21, 2026

(54) DATA STORAGE DEVICE SHAPING READ THERMAL SENSOR BIAS SIGNAL TO BALANCE WRITE THERMAL SENSOR SIGNAL DURING LASER OPERATION

(71) Applicant: Western Digital Technologies, Inc., San Jose, CA (US)

(72) Inventors: Sukumar Rajauria, San Jose, CA (US); Cliff Zhang, San Jose, CA (US); Joey M. Poss, Rochester, MN (US)

(73) Assignee: Western Digital Technologies, Inc., San Jese (CA)

( * ) Notice: Subject to any disclaimer, the term of this patent is extended or adjusted under 35 U.S.C. 154(b) by 0 days.

(21) Appl. No.: 18/977,095

(22) Filed: Dec. 11, 2024

(65) Prior Publication Data

US 2026/0162674 A1     Jun. 11, 2026

(51) Int. Cl.
*G11B 5/012*       (2006.01)
*G11B 5/00*        (2006.01)

(52) U.S. Cl.
CPC ...... *G11B 5/012* (2013.01); *G11B 2005/0021* (2013.01)

(58) Field of Classification Search
CPC ..... G11B 21/106; G11B 5/012; G11B 20/182; G11B 5/02; G11B 5/40; G11B 20/10351; G11B 2005/0021; G11B 2005/0013; G11B 20/18; G11B 2005/0018; G11B 11/1051; G11B 11/105; G11B 5/6088; G11B 11/10511; G11B 7/1263; G11B 7/1267

USPC .............................................. 360/62, 67, 59
See application file for complete search history.

(56) References Cited

U.S. PATENT DOCUMENTS

| | | | |
|---|---|---|---|
| 8,908,483 | B1 | 12/2014 | Ren et al. |
| 9,047,926 | B2 | 6/2015 | Contreras et al. |
| 9,595,288 | B1 | 3/2017 | Chu et al. |
| 9,818,447 | B1 | 11/2017 | Zheng et al. |
| 10,056,098 | B1 | 8/2018 | Rajauria et al. |
| 10,366,722 | B1 | 7/2019 | Mendonsa et al. |
| 10,540,998 | B2 * | 1/2020 | Tatah .................... H01S 5/0261 |
| 10,910,007 | B1 * | 2/2021 | Trinh .................. G11B 5/3133 |
| 10,997,997 | B1 | 5/2021 | Xiong |
| 2017/0162222 | A1 | 6/2017 | Matousek et al. |
| 2024/0005957 | A1 | 1/2024 | Contreras et al. |
| 2024/0177735 | A1 | 5/2024 | Knigge et al. |

OTHER PUBLICATIONS

Chen et al., Effectiveness of a pulsed laser in heat-assisted magnetic recording, 2023, Retrieved from https://www.nature.com/articles/s41598-023-38398-x.

(Continued)

*Primary Examiner* — Nabil Z Hindi
(74) *Attorney, Agent, or Firm* — NOD Law PC

(57) ABSTRACT

A data storage device comprises a disk and a recording head. The recording head comprises a write thermal sensor, a read thermal sensor, and a laser configured for heat assisted magnetic recording (HAMR). Control circuitry shapes a bias signal applied to the read thermal sensor to mirror a thermal response of the write thermal sensor during laser operation, generates a differential signal based on a difference between the write thermal sensor response and the read thermal sensor response, and monitors the differential signal to detect laser mode hopping.

20 Claims, 10 Drawing Sheets

(56)            References Cited

OTHER PUBLICATIONS

Wu et al., Use of an Embedded Contact Sensor to Study Nanoscale
Heat Transfer in Heat Assisted Magnetic Recording, Jan. 5, 2017,
Retrieved from https://cml.berkeley.edu/wp-content/uploads/blue-
reports/16006.pdf.

* cited by examiner

SHAPE BIAS SIGNAL APPLIED TO READ THERMAL SENSOR TO MIRROR RESPONSE OF WRITE THERMAL SENSOR DURING HAMR LASER ACTIVATION ~82

GENERATE DIFFERENTIAL SIGNAL FROM DIFFERENCE BETWEEN WRITE THERMAL SENSOR SIGNAL AND READ THERMAL SENSOR SIGNAL ~84

MONITOR DIFFERENTIAL SIGNAL TO DETECT LASER MODE HOPPING ~86

DATA STORAGE DEVICE SHAPING READ THERMAL SENSOR BIAS SIGNAL TO BALANCE WRITE THERMAL SENSOR SIGNAL DURING LASER OPERATION

BACKGROUND

Data storage devices such as disk drives comprise a magnetic storage medium such as a disk and a recording (read/write) head connected to a distal end of an actuator arm that is rotated about a pivot by an actuator such as a voice coil motor (VCM) to position the recording head radially at a carefully controlled fly height over the disk. The disk comprises a plurality of radially spaced, concentric tracks for recording user data sectors and servo sectors. The servo sectors comprise head positioning information (e.g., a track address) that is read by the recording head and processed by a servo control system to control the actuator arm as it seeks from track to track. A disk drive typically comprises a plurality of disks each having a top and bottom surface accessed by a respective recording head. The actuator typically rotates a number of actuator arms about a pivot in order to simultaneously position a number of recording heads over respective disk surfaces based on the servo data recorded on each disk surface.

FIG. 1 is a conceptual diagram of a conventional disk format 2 comprising a number of servo tracks 4 defined by servo sectors $6_0 \ldots 6_N$ recorded around the circumference of each servo track 4. Each servo sector $6_i$ comprises a preamble 8 for storing a periodic pattern that allows proper gain adjustment and timing synchronization of the read signal, and a sync mark 10 for storing a special pattern used to symbol synchronize to a servo data field 12. Servo data field 12 stores coarse head positioning information, such as a servo track address, used to position the head over a target data track during a seek operation. Each servo sector $6_i$ further comprises groups of servo bursts 14 (e.g., N and Q servo bursts) that are recorded with a predetermined phase relative to one another and relative to the servo track centerlines. The phase-based servo bursts 14 provide fine head positioning information used for centerline tracking while accessing a data track during read and write operations. A position error signal (PES) generated by reading servo bursts 14 represents a measured position of the recording head relative to a centerline of a target servo track. A servo controller processes the PES to generate a control signal applied to the actuator to actuate the recording head radially over the disk in a direction that reduces the PES.

In order to achieve higher areal densities, recording heads are sometimes configured for heat-assisted magnetic recording (HAMR). HAMR facilitates higher data densities by temporarily heating the recording medium during the write process. A laser integrated into the write head heats a tiny spot on the disk surface to lower its magnetic coercivity, making it easier for the write head to change the magnetic orientation of that specific area. Once the medium cools down, it retains the written data in a stable and permanent state. The HAMR heating process allows the use of media with smaller and more thermally stable magnetic grains, which in turns allows for higher data storage densities compared to traditional recording methods. However, the HAMR laser sometimes experiences a phenomenon known as laser mode hopping in which the laser suddenly changes between two or more available modes of laser emission. Such sudden changes in laser emission modes may cause sudden shifts in the output power or amplitude of the laser, which in turn may cause sudden, unpredictable write width changes and changes in fly height and write strength. Thus, detection and management of laser mode hopping is of substantial importance in a disk drive incorporating heat-assisted magnetic recording.

The description provided in this background section should not be assumed to be prior art merely because it is mentioned in or associated with this background section. The background section may include information that describes one or more aspects of the subject technology.

SUMMARY

The following summary relates to one or more aspects or embodiments disclosed herein. It is not an extensive overview relating to all contemplated aspects or embodiments, and should not be regarded as identifying key or critical elements of all contemplated aspects or embodiments, or as delineating the scope associated with any particular aspect or embodiment. The following summary has the sole purpose of presenting certain concepts relating to one or more aspects or embodiments disclosed herein in a simplified form to precede the detailed description that follows.

Some aspects of this disclosure are directed to a data storage device comprising a disk; a recording head comprising a write thermal sensor configured in or adjacent to a write element, a read thermal sensor configured in or adjacent to a read element, and a laser configured for heat assisted magnetic recording (HAMR); and one or more processing devices or components configured, alone or in combination, to shape a bias signal applied to the read thermal sensor to mirror a thermal response of the write thermal sensor during operation of the laser.

In some implementations, the one or more processing devices or components are further configured, alone or in combination, to generate a differential signal based on a difference between the thermal response of the write thermal sensor and a thermal response of the read thermal sensor.

In some implementations, the one or more processing devices or components are further configured, alone or in combination, to monitor the differential signal to detect mode hopping of the laser.

In some implementations, the one or more processing devices or components are further configured to detect mode hopping of the laser by detecting spikes in the differential signal.

In some implementations, the read thermal sensor is an embedded contact sensor (ECS) and the write thermal sensor is a near field temperature sensor (NTS).

In some implementations, during an initial sector write, the one or more processing devices or components are further configured to shape the bias signal applied to the read thermal sensor as $\text{ECS}(t) = \text{ECS}_{Bias} + \text{ECS}_{OS} * \exp(-t/\text{ECS}_{Tau})$, where $\text{ECS}(t)$ is the bias signal, $\text{ECS}_{Bias}$ is a programmable baseline level for the bias signal, $\text{ECS}_{OS}$ is a programmable offset that counteracts a temperature spike in the thermal response of the write thermal sensor from laser activation, and $\text{ECS}_{Tau}$ is a programmable time constant that controls a rate of exponential decay of the bias signal.

In some implementations, during a servo ID read, the one or more processing devices or components are further configured to shape the bias signal applied to the read thermal sensor as $\text{ECS}(t2) = \text{ECS}(t1) + (\text{ECS}_{Bias} + \text{ECS}_{OS} - L(t1)) * (1 - \exp((t1-t2)/\text{ECS}_{GapTau}))$, where t1 is the beginning of the servo ID read, t2 is the end of the servo ID read, and $\text{ECS}_{GapTau}$ is a time constant that controls a rate of exponential ramp up of the bias signal.

In some implementations, during a sector write following the servo ID read, the one or more processing devices or components are further configured to shape the bias signal applied to the read thermal sensor as $ECS(t)=ECS_{Bias}+ (ECS$ $(t2)-ECS_{Bias})*exp((t2-t)/ECS_{Tau})$.

Other aspects of this disclosure are directed to a method for detecting laser mode hopping in a data storage device. The method comprises shaping a bias signal applied to a read thermal sensor configured in a recording head of the data storage device to mirror a thermal response of a write thermal sensor configured in the recording head during operation of a laser configured for heat assisted magnetic recording (HAMR); generating a differential signal based on a difference between the thermal response of the write thermal sensor and a thermal response of the read thermal sensor; and monitoring the differential signal to detect laser mode hopping.

Further aspects of this disclosure are directed to control circuitry for controlling a recording head of a data storage device, wherein the recording head comprises a write thermal sensor configured in a write element, a read thermal sensor configured in a read element, and a laser configured for heat assisted magnetic recording (HAMR), and the control circuitry is configured to shape a bias signal applied to the read thermal sensor to mirror a thermal response of the write thermal sensor during operation of the laser.

Various additional aspects of this disclosure are described below and depicted in the accompanying figures and will be further apparent based thereon.

BRIEF DESCRIPTION OF THE DRAWINGS

Various features and advantages of this disclosure will be apparent from the following description and accompanying drawings. The drawings are not necessarily to scale; emphasis instead is placed on illustrating the principles of this disclosure. In the drawings, like reference characters may refer to the same parts throughout the different views. The drawings depict only illustrative examples of this disclosure and are not limiting in scope.

DETAILED DESCRIPTION

The words "exemplary" and "example" as used herein mean "serving as an example, instance, or illustration." Any embodiment described herein as "exemplary" or as an "example" should not be construed as preferred or advantageous over other embodiments.

The embodiments described herein do not limit the invention to the precise form disclosed, nor are they exhaustive. Rather, various embodiments are presented to provide a description for utilization by others skilled in the art. Technology continues to develop, and elements of the disclosed embodiments may be replaced by improved and enhanced items. This disclosure inherently discloses elements incorporating technology available at the time of this disclosure.

Figure 1:
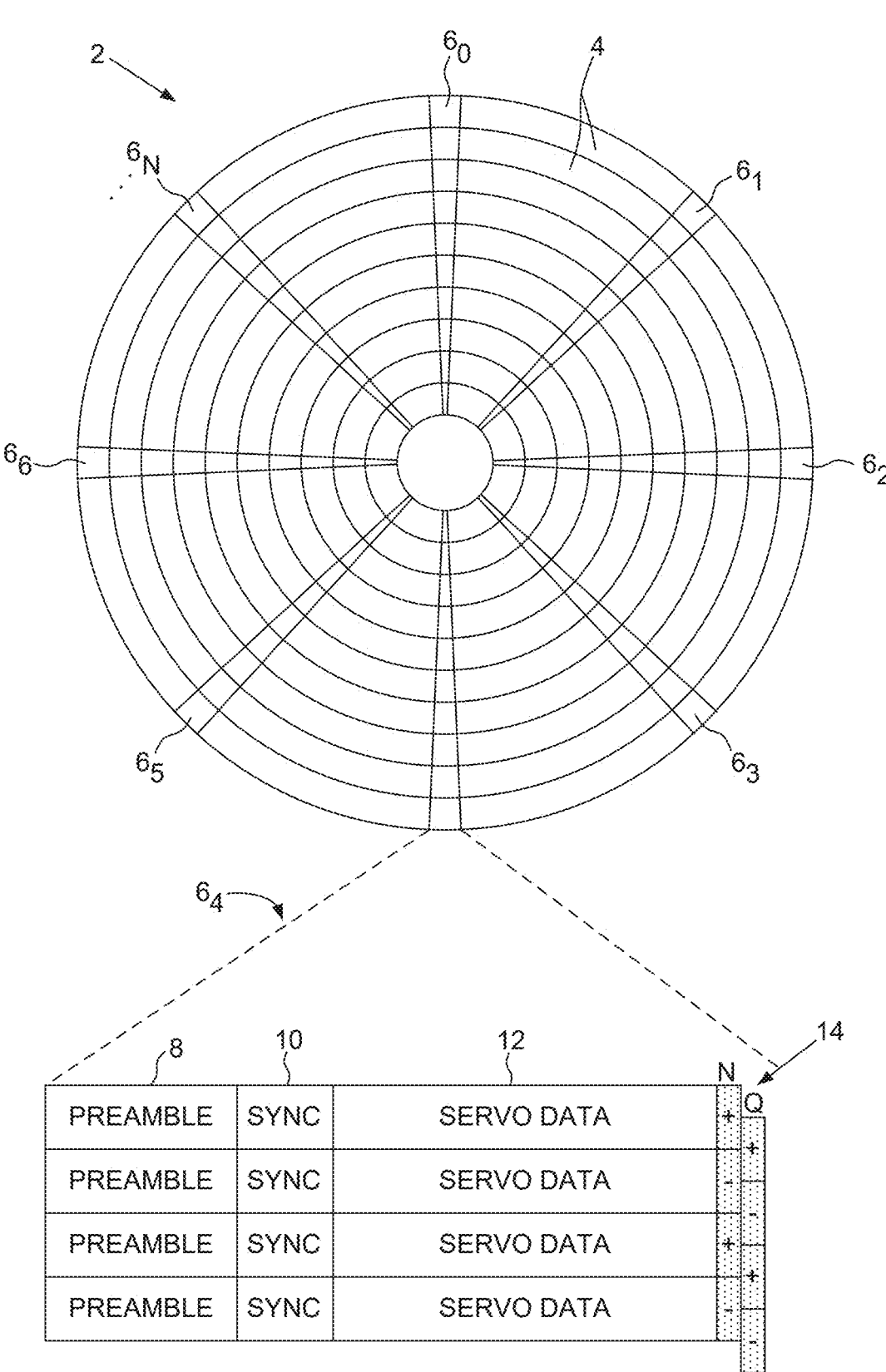
FIG. 1 is a conceptual diagram of a conventional disk format, in accordance with aspects of this disclosure.
Figures 2A, 2B, 2C:
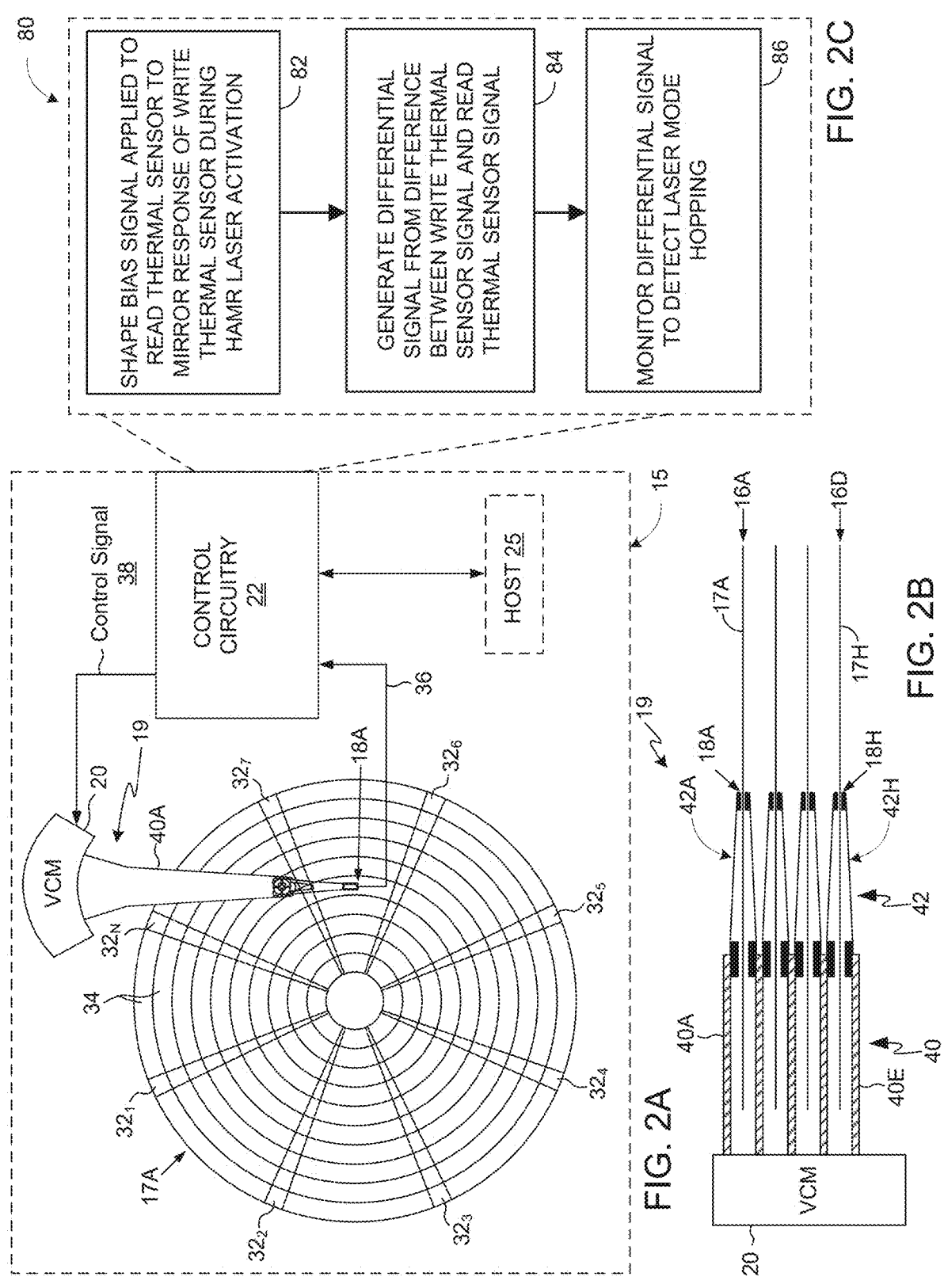
FIG. 2A is a conceptual diagram of a top view of a data storage device in the form of a hard disk drive (HDD), in accordance with aspects of this disclosure.
FIG. 2B is a conceptual diagram of a side view of a data storage device in the form of an HDD, in accordance with aspects of this disclosure.
FIG. 2C is a flow diagram illustrating a method for improved mode hop detection in a data storage device configured for heat assisted magnetic recording (HAMR), in accordance with aspects of this disclosure.

FIGS. 2A and 2B are conceptual top and side views of a data storage device in the form of hard disk drive (HDD) 15, in accordance with aspects of this disclosure. HDD 15 comprises recording heads 18 (e.g., recording heads 18A . . . 18H) that are actuated and positioned over surfaces 17 (e.g., surfaces 17A . . . 17H) of magnetic storage media 16 (e.g., disks 16A . . . 16D) by actuator assembly 19. Recording heads 18 comprise write and read elements configured for writing and reading data and control features to and from disk surfaces 17. Actuator assembly 19 comprises primary actuator 20, which is typically a voice coil motor (VCM), and a number of actuator arms 40 (e.g., actuator arms 40A . . . 40E). Each head 18 is configured in a slider at a distal end of an actuator arm 40 via a suspension 42 (suspensions 42A . . . 42H). Each actuator arm 40 is configured to suspend a head 18 in close proximity over a corresponding disk surface 17. For example, head 18A is suspended by topmost actuator arm 40A via suspension 42a over topmost disk surface 17A, and head 18H is suspended by lowest actuator arm 40H via suspension 42H over lowest disk surface 17H. FIGS. 2A-B are presented for exemplary purposes only; a wide variety of other numbers of disks, disk surfaces, primary actuators, actuator assemblies, suspensions, and heads are contemplated and may be used.

Control circuitry 22 may be implemented in one or more processing devices and performs or executes various methods, processes, functions, and tasks to manage and control operation of HDD 15, and in particular to manage and control operation of recording heads 18. For example, positioning data from servo sectors or wedges $32_1 \ldots 32_N$ on disk surfaces 17 included in read signals 36 from recording heads 18 allows control circuitry 22 to determine the position of each head 18 relative to disk surface 17. Based on a position error signal (PES) that represents the difference between the head's actual position and the target track, control circuitry 22 generates control signals 38 that are sent to actuator 20, which adjusts the alignment of heads 18 to maintain accurate tracking over tracks 34.

FIG. 2C is a flow diagram depicting a method 80 performed by control circuitry 22 for detecting laser mode hopping in a data storage device, in accordance with aspects of this disclosure. Method 80 provides for enhanced detection of mode hopping, which is a phenomenon in heat assisted magnetic recording (HAMR) systems where sudden shifts in the power or wavelength of a laser in the recording head causes sudden temperature spikes that can impact data recording integrity. Temperature spikes or transients caused by mode hopping can be detected by thermal sensors in the recording head. However, activation of the HAMR laser itself causes a rapid temperature increase or transient that may initially dominate the thermal sensor signals and mask any temperature spikes or transients that are due to mode hopping. Method 80 balances the thermal sensor signals to ensure that spikes or transients from mode hopping stand out clearly and can be reliably detected even during the rapid temperature increase following laser turn on.

In step 82 of method 80, control circuitry 22 shapes a bias signal applied to a read thermal sensor, such as an embedded contact sensor (ECS), configured in a read element of a recording head to mirror a thermal response of a write thermal sensor, such as a near field temperature sensor (NTS), configured in a write element of the recording head during activation of a laser used for heat assisted magnetic recording (HAMR). In step 84, control circuitry 22 generates a differential signal based on a difference between the thermal response of the write thermal sensor and a thermal response of the read thermal sensor. In step 86, control circuitry 22 monitors the differential signal to detect mode hopping of the laser. Method 80 will be described in more detail herein with reference to FIGS. 3-8C.

Figure 3:
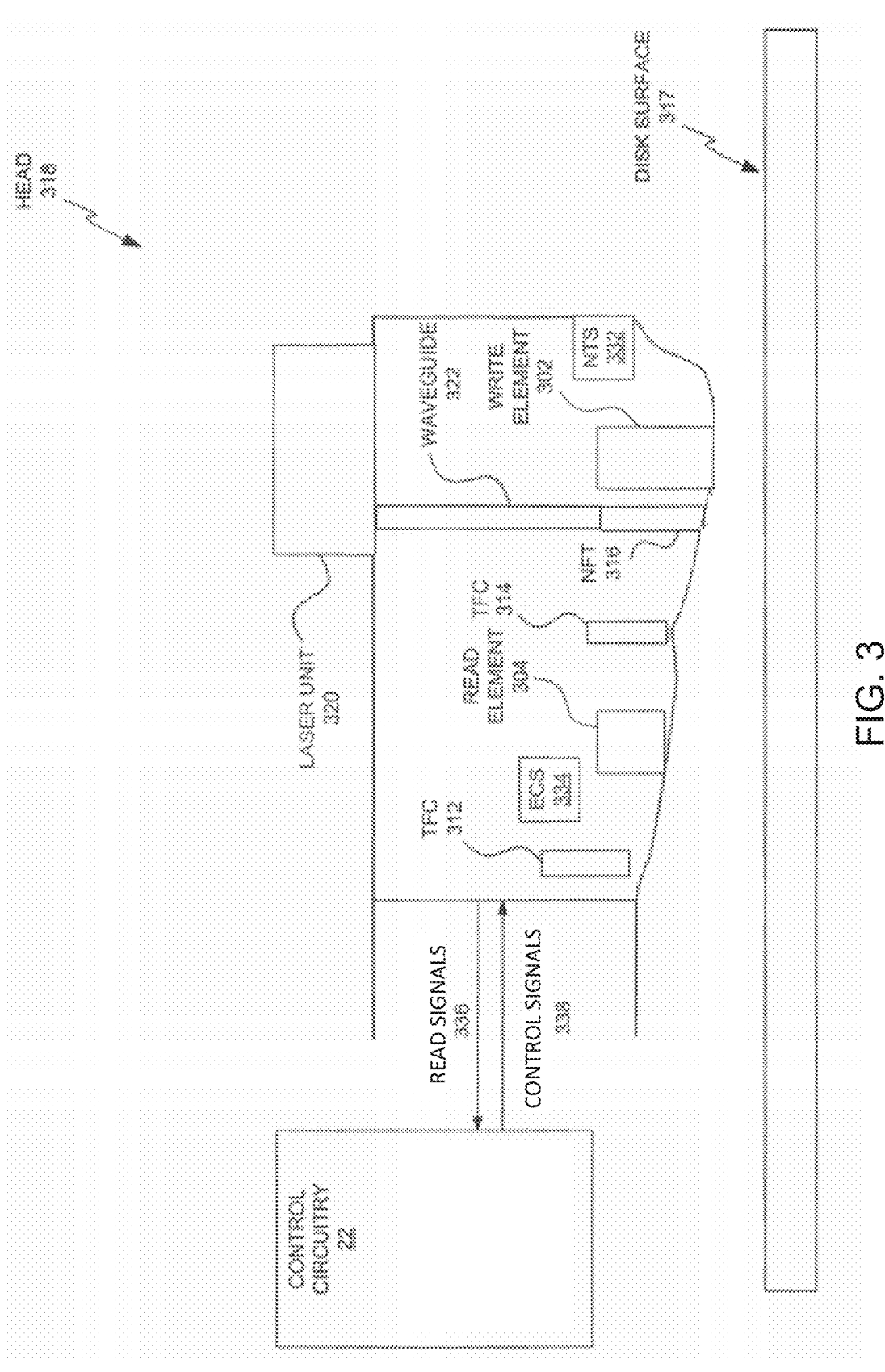
FIG. 3 is a conceptual sectional diagram of a recording head of a data storage device suspended above and operating proximate to a disk surface, in accordance with aspects of this disclosure.

FIG. 3 is a conceptual sectional diagram of a recording head 318 of a data storage device suspended above and operating proximate to a disk surface 317, in accordance with aspects of this disclosure. Head 318 and disk surface 317 are examples of heads 18 and disk surfaces 17 of FIGS. 2A and 2B. Control circuitry 22 outputs control signals 338 to recording head 318 and receives read signals 336 (including data signals, control signals, and thermal sensor signals) from head 318. It should be noted that FIG. 3 is a conceptual diagram and not an engineering schematic, and that the elements depicted in FIG. 3 may be configured in orientations and arrangements other than the example configuration that is shown in FIG. 3.

Recording head 318 comprises write element 302 and read element 304. Control circuitry 22 causes data to be written to disk surface 317 by modulating a write current in an inductive write coil in write element 302 to create a magnetic field strong enough to magnetize a bit of magnetic material in disk surface 17 in one direction, representing a binary one, or in an opposite direction, representing a binary zero. Read element 304, typically a magneto resistive (MR)

sensor, detects the direction of magnetization in the magnetized bits of disk surface 317 through changes in resistance in the MR sensor. Resistance changes in the MR sensor correspond to the binary one and zero states of the magnetized bits and are converted by control circuitry 22 into readable digital data. Recording head 318 may also comprise thermal fly height (TFC) elements such as TFC heaters 312 and 314 that generate localized heat to expand or bulge head 318 slightly towards disk surface 317, enabling precise control over fly height.

Recording head 318 further comprises laser unit 320, which in some examples is a semiconductor laser diode designed to emit light at a wavelength suitable for heating. Waveguide 322 is configured to direct light emitted by laser unit 320 to near-field transducer (NFT) 316, which in some examples is a metallic structure situated near write element 302 that is shaped to concentrate the laser light into a tiny (nanoscale) spot on disk surface 317 where the data needs to be written. This localized heating temporarily reduces the magnetic coercivity of the disk material, such that its magnetic state can be changed with less magnetic energy, thereby allowing write element 302 to write to more closely spaced regions without spreading magnetic influence beyond the target area. By confining each recorded bit to a smaller area, more data can be packed into the same physical space on the disk, such that higher storage densities can be achieved.

Recording head 318 further comprises write thermal sensor 332 and read thermal sensor 334. In some examples, write thermal sensor 332 is a near-field temperature sensor (NTS) that measures temperature proximate to NFT 316 and write element 302, and read thermal sensor 334 is an embedded contact sensor (ECS) that measures temperature proximate to read element 304. In the following description, while write thermal sensor 332 is often referred to as NTS 332 and read thermal sensor 334 is often referred to as ECS 334, it should be understood that write thermal sensor 332 may comprise thermal sensor types other than an NTS, and read thermal sensor 334 may comprise thermal sensor types other than an ECS. Thermal sensors 332 and 334 are each typically implemented as a resistive temperature detector (RTD), which in some examples is a thin metal film deposited on a substrate that changes its electrical resistance predictably with temperature, allowing precise measurement of thermal changes. The thermal sensor signals can be used to estimate fly height as closer proximity to disk surface 317 increases localized heating, allowing control circuitry 22 to infer changes in head-disk spacing. In addition, and of particular relevance to this disclosure, the thermal sensor signals can be used to detect localized temperature spikes caused by mode hopping and laser activation.

In a phenomenon known as laser mode hopping, when control circuitry 22 applies current or power to laser unit 320 during write operations, laser unit 320 may exhibit sudden changes between two or more available modes of laser emission. Such sudden changes in laser emission modes may cause transients, or sudden shifts in magnitude, in the output power or amplitude of the laser being emitted by laser unit 320. Because laser mode hopping can create sudden and unpredictable changes in the amplitude of the laser heating the area of disk surface 317 to be written to by write element 302, it may also cause sudden and unpredictable write width changes, even while the write current applied to write element 302 remains constant. That is, a greater or lesser track width across disk surface 317 may be susceptible to being written to, by the constant write current, in response to laser 320 suddenly becoming more or less powerful. Laser mode hops may also cause sudden changes in thermal expansion and protrusion effects in the area of head 318 proximate to NFT 316 and write element 302, which in turn may cause changes in fly height and write strength. Thus, unmitigated laser mode hop effects on write strength and other aspects such as fly height pose a substantial challenge in advancing the performance of HAMR drives.

Figure 4:
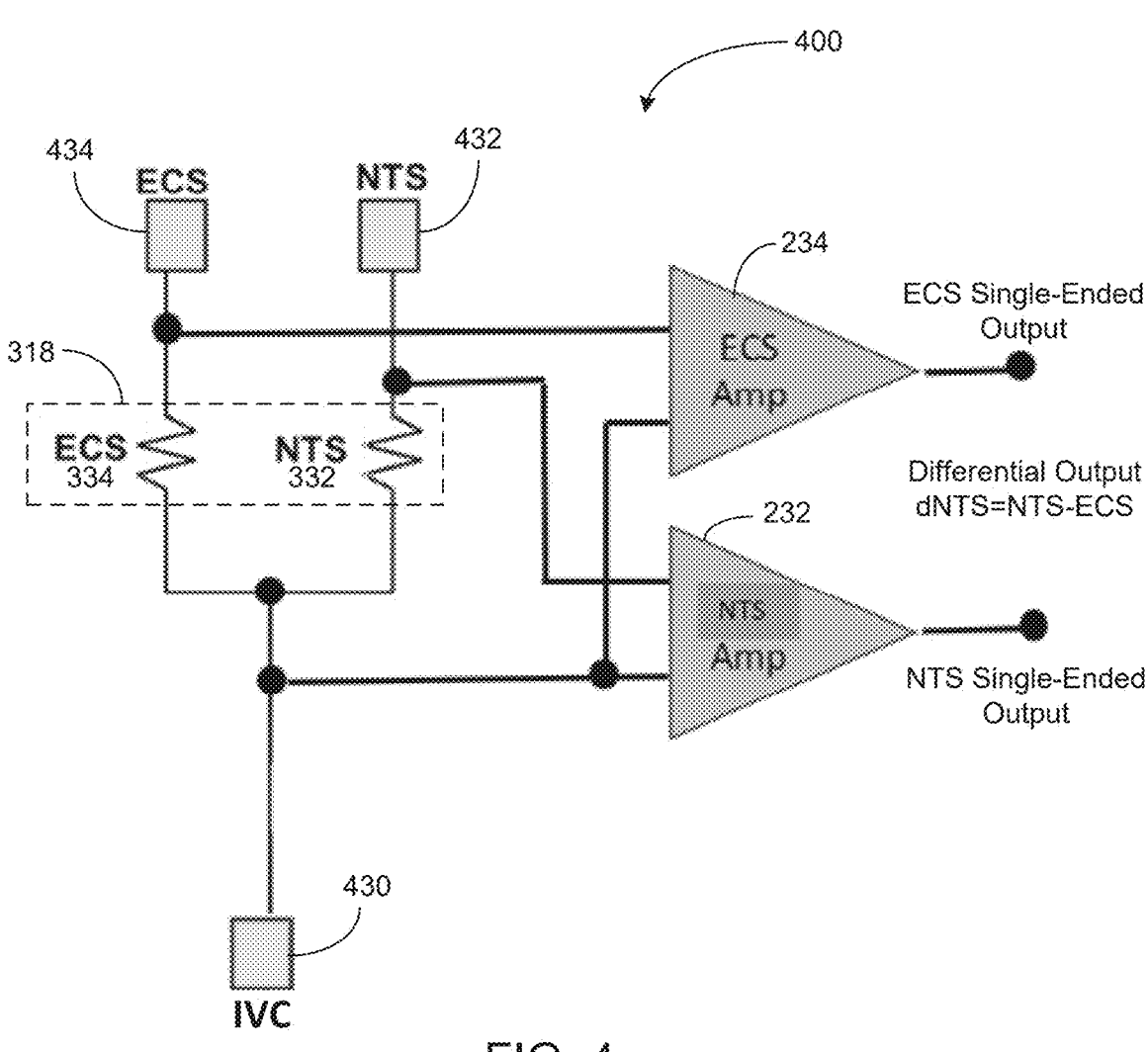
FIG. 4 is a conceptual circuit diagram illustrating control circuitry configured to generate single-ended and differential signals from thermal sensors configured in the recording head, in accordance with aspects of this disclosure.

FIG. 4 is a conceptual circuit diagram illustrating control circuitry 400 configured to generate single-ended and differential thermal sensor signals from write thermal sensor (NTS) 332 and read thermal sensor (ECS) 334 configured in recording head 318, in accordance with aspects of this disclosure. In FIG. 4, NTS 332 and ECS 334 are configured in recording head 318, as indicated by the dashed box, whereas the portions of FIG. 4 outside of the dashed box are a part of control circuitry 400 that may be configured in recording head 318 or elsewhere. Control circuitry 400 is a portion or module of control circuitry 22 and will typically be located close to recording head 318 to minimize signal loss and susceptibility to noise, as the small scale signals from NTS 332 and ECS 334 require immediate amplification and processing to maintain accuracy. Control circuitry 400 may be configured in a preamp module, for example, which is typically located close to recording head 318.

NTS 332 is positioned in close proximity to NFT 316 (FIG. 3) and is very sensitive to localized heating at NFT 316 by laser 320, whereas ECS 334 is located further from NFT 316 and is less directly impacted by laser heating. To ensure that NTS 332 and ECS 334 operate accurately within their optimal range, bias voltages are applied to each sensor. As shown in FIG. 4, an ECS bias voltage is applied to ECS 334 at ECS bias voltage pad 434, and an NTS bias voltage is applied to NTS 332 at NTS bias voltage pad 432. Bias voltages 432 and 434 establish a stable reference level for respective thermal sensors 332 and 334 and are intended to ensure that they operate in a linear region where small temperature-induced changes in resistance are accurately reflected in the output signal. Signal distortion is minimized so that thermal sensors 332 and 334 can detect subtle temperature variations. Bias voltages 432, 434 also help to stabilize sensors 332, 334 against environmental noise and drift. Interfacial voltage control (IVC) 430 applies a common-mode reference voltage to both NTS 332 and ECS 334. By setting a common-mode reference voltage, IVC 430 enables rejection of common-mode noise and helps to keep the outputs of thermal sensors 332, 334 within a specific operating range.

NTS amplifier 232 and ECS amplifier 234 are provided to amplify the respective single-ended signals from NTS 332 and ECS 334. Amplifiers 232 and 234 amplify the signals from NTS 332 and ECS 334 relative to the IVC common-mode reference voltage, which further reduces the impact of common-mode noise. In addition to the single-ended signals, control circuitry 400 generates a differential output signal dNTS by comparing the amplified outputs of NTS amplifier 232 and ECS amplifier 234 (dNTS=NTS−ECS). The differential signal dNTS represents the temperature difference between NTS 332 and ECS 334, which is particularly useful for mode hopping detection. Mode hopping in a HAMR drive causes localized temperature spikes at NFT 316 due to sudden changes in the power or wavelength of laser 320. The differential dNTS signal is highly effective for detecting such spikes because dNTS focuses on the relative temperature difference between NTS 332 and ECS 334 and filters out common-mode noise, environmental temperature fluctuations, and other thermal changes that tend to impact NTS 332 and ECS 334 in a similar manner.

By using the difference between the NTS and ECS signals, control circuitry 400 effectively cancels out common mode effects and isolates localized temperature differences between NTS 332 and ECS 334, making transient events such as mode hopping stand out more clearly.

Detecting mode hopping from the dNTS signal alone, however, can be problematic during the initial transient phase immediately after activation of laser 320. During this initial transient phase, NTS 334—due to its close proximity to NFT 316—experiences a rapid temperature increase as NFT 316 concentrates the energy of laser 320 onto disk surface 317. This intense, transient heating effectively dominates the dNTS signal, creating a large initial spike that may mask smaller temperature spikes caused by mode hopping.

Figure 5A:
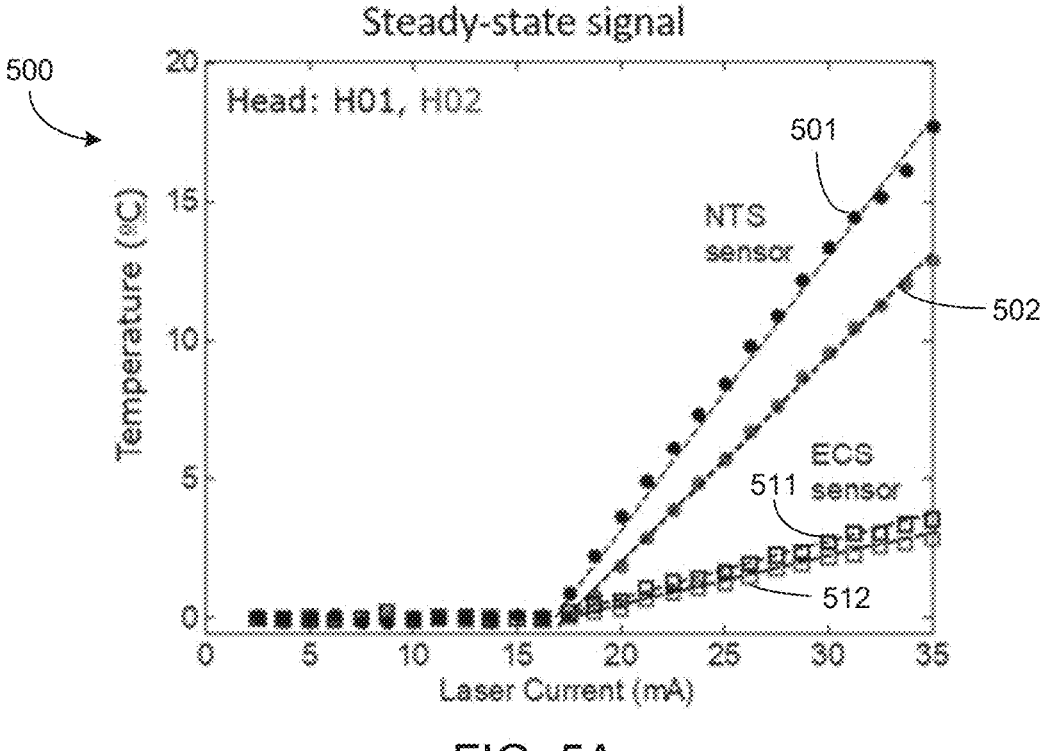
FIG. 5A is a graph showing steady-state temperature responses of a near-field temperature sensor (NTS) and an embedded contact sensor (ECS) relative to laser current, in accordance with aspects of this disclosure.
Figure 5B:
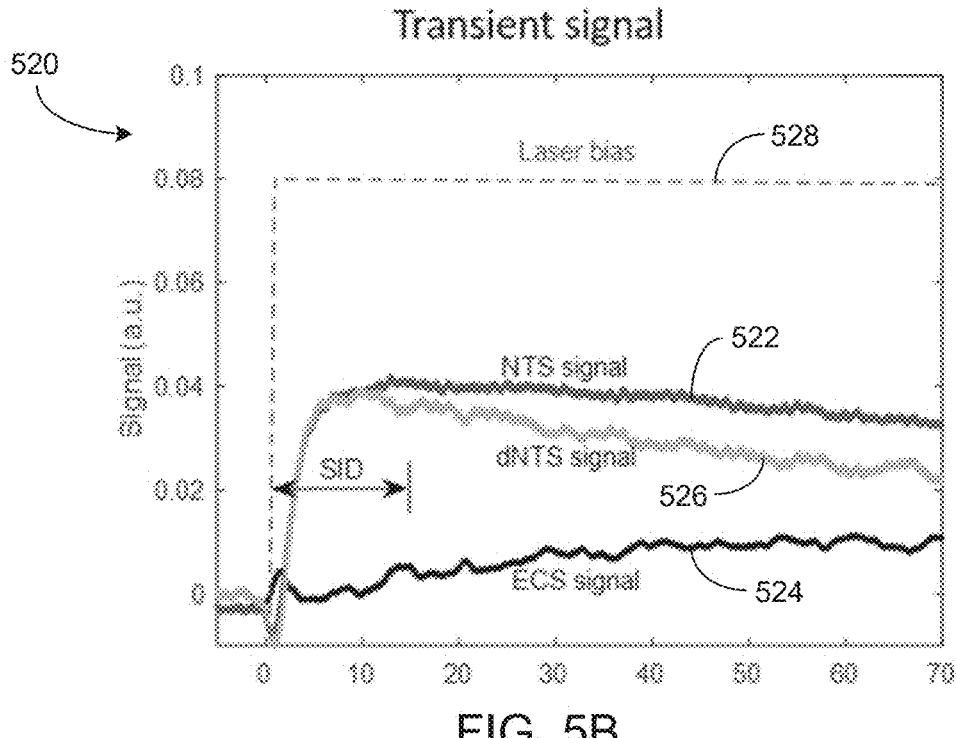
FIG. 5B is a graph showing the transient response of the NTS and ECS sensors versus time when laser current is applied, in accordance with aspects of this disclosure.

FIGS. 5A-5B illustrate the steady-state and transient thermal responses of NTS 316 and ECS 334 during activation of laser 320. FIG. 5A is a graph 500 showing temperature responses of NTS 332 and ECS 334 to varying laser currents, where the x-axis shows the laser current in mA, and the y-axis shows the temperature readings (C) from NTS 332 and ECS 334 as the laser current varies, in accordance with aspects of this disclosure. Graph 500 includes data for two different recording heads H01 and H02 to illustrate how thermal sensor response can vary slightly between heads due to individual head characteristics. In particular, plot 501 represents the NTS of head H01 and plot 502 represents the NTS of head H02, while plot 511 represents the ECS of head H01 and plot 512 represents the ECS of head H02. As can be seen in FIG. 5A, the NTS sensors (plots 501 and 502) exhibit a temperature increase that is approximately 4.7 to 4.8 times higher than that of the ECS sensors (plots 511 and 512). This unbalanced steady-state response (the larger and faster temperature rise of the NTS relative to the ECS) is due to the positional difference of NTS 332 and ECS 334 relative to the heat-generating NFT 316 (see, e.g., FIG. 3).

FIG. 5B is a graph 520 showing the transient response of the thermal sensors (NTS 332 and ECS 334) versus time when laser current is applied, in accordance with aspects of this disclosure. As can be seen in FIG. 5B, dNTS is even more unbalanced during the transient condition of laser activation, during which NTS 332 reacts immediately and intensely to activation of laser 320 due to its close proximity to NFT 316. In FIG. 5B, the response of NTS 332 (as indicated by NTS signal 522), ECS 334 (as indicated by ECS signal 524), and the differential between NTS signal 522 and ECS signal 524 (as indicated by dNTS signal 526) to activation of HAMR laser 320 (as indicated by laser bias 528) is shown. Immediately after application of laser bias 528 to activate laser 320, NTS signal 522 shows a rapid and steep increase, resulting in a pronounced spike due to the close proximity of NTS 332 to NFT 316. This spike reflects the intense, localized heating near NFT 316, which is sensed almost instantaneously by NTS 332. ECS signal 524 shows a much slower and more gradual increase, indicating that ECS 334 is less affected by the immediate heating of NFT 316 by laser 320 since ECS 334 is further from NFT 316. The dNTS signal 526, which is the difference between NTS signal 522 and ECS signal 524, initially mirrors the sharp transient rise seen in NTS signal 522, resulting in an initial significant spike in dNTS signal 526. Thus, dNTS signal 526 is initially dominated by the rapid, unbalanced heating of NTS 332 relative to ECS 334 in response to laser 320 turning on.

Because of the intense, transient heating during this initial phase when laser 320 is activated, reliable identification of smaller temperature spikes that might be caused by mode hopping can be challenging, which limits the effectiveness of the dNTS signal for immediate mode hop detection. Thus, there is a need to mitigate the effects of this initial thermal transient so that laser mode hop events are able to stand out clearly even during this initial phase. According to aspects of this disclosure, to ensure that laser mode hop events are detectable even during the initial laser heating phase, the ECS bias pulse 434 applied to ECS 334 (see FIG. 4) is shaped to counterbalance or mimic the transient response of NTS 332, effectively nulling out the dNTS signal in both transient and steady-state conditions.

Figure 6:
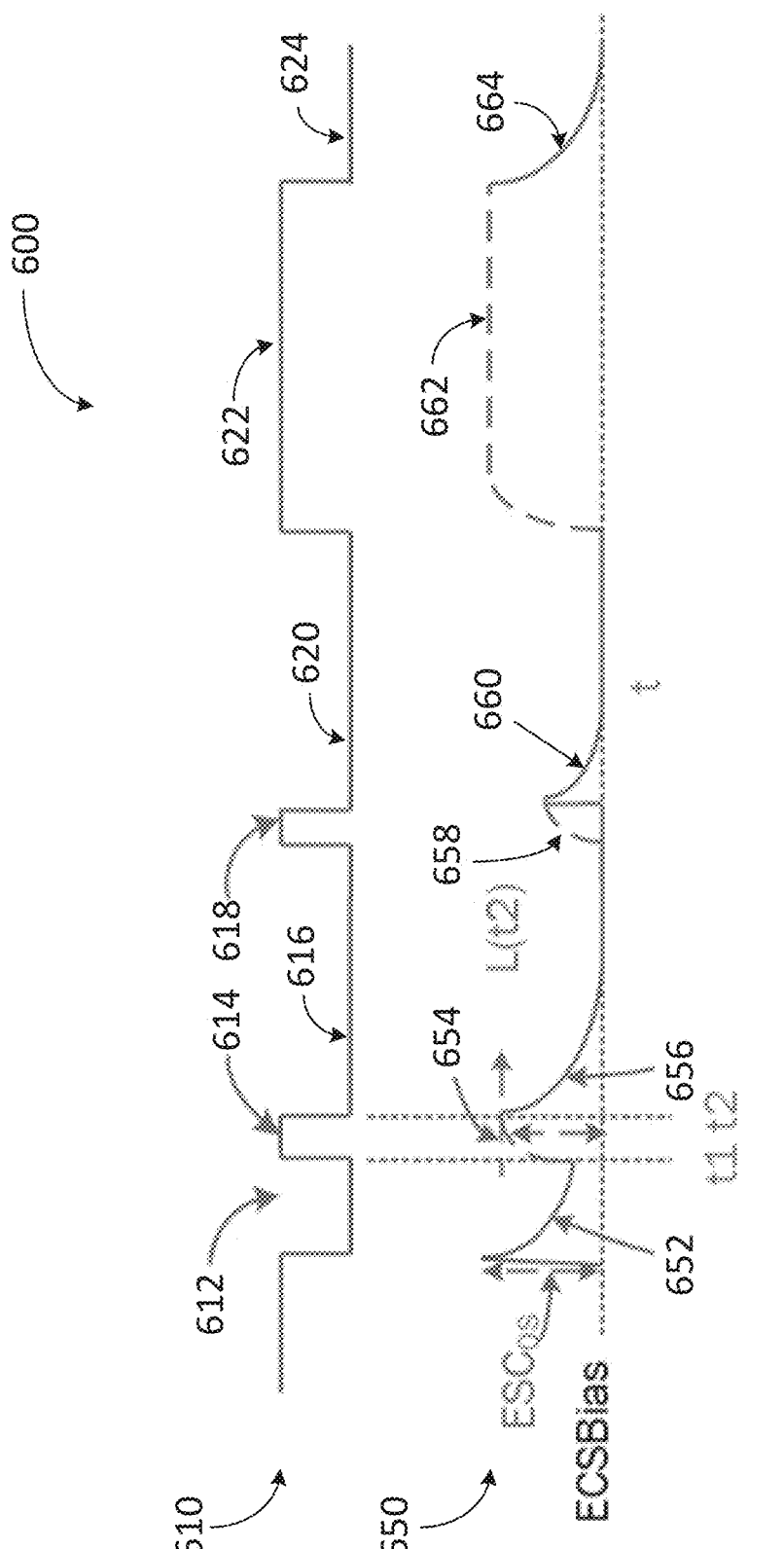
FIG. 6 is a conceptual diagram illustrating ECS bias pulse shaping to mirror and counteract NTS transient response during exemplary recording head operations, in accordance with aspects of this disclosure.

FIG. 6 is a conceptual diagram 600 illustrating the shaping of ECS bias signal 650, which corresponds to ECS bias signal 434 applied to ECS 334 as shown in FIG. 4, to mirror and counteract the transient response of NTS 332 during various exemplary operational phases 610 of disk drive operation. Programmable parameters, such as $ECS_{Bias}$, $ECS_{OS}$, $ECS_{Tau}$, and $ECS_{GapTau}$, are used to control and shape ECS bias signal 650 in correspondence with the response of NTS 332 during various operational phases 610. The non-limiting examples of disk drive operational phases 610 illustrated in FIG. 6 include sector writes 612, 616, 620, and 624; servo ID reads 614 and 618; and sector skip 622.

During initial sector write 612, ECS bias pulse segment 652 is shaped to mirror the sharp temperature rise in NTS signal 522 (see FIG. 5B) at laser activation followed by a gradual cooldown. The parameters $ECS_{Bias}$, $ECS_{OS}$, and $ECS_{Tau}$ are programmable to shape ECS bias pulse segment 652 in accordance with the following equation (1):

$$ECS(t)=ECS_{Bias}+ECS_{OS}*\exp(-t/ECS_{Tau}) \qquad (1)$$

In equation (1), $ECS_{Bias}$ is a baseline level for the ECS(t) bias signal; $ECS_{OS}$ is an offset added to counteract the NTS temperature spike from laser activation; and $ECS_{Tau}$ is a time constant that controls the rate of exponential decay of the ECS(t) bias signal. At the beginning of initial sector write 612, t=0 and the ECS bias starts at an elevated level: $ECS(0)=ECS_{Bias}+ECS_{OS}$. As time progresses during initial sector write 612, ECS(t) begins to decay exponentially in accordance with the time constant $ECS_{Tau}$, where a larger $ECS_{Tau}$ results in a slower decay that keeps the ECS bias signal elevated for a longer period, and a smaller $ECS_{Tau}$ results in a faster decay that brings the ECS bias signal closer to the baseline level more quickly. Thus, by appropriate programming of $ECS_{Bias}$, $ECS_{OS}$, and $ECS_{Tau}$, ECS bias pulse segment 652 is fine tuned to match the thermal response of NTS 332 during initial sector write 612.

During servo ID read 614 following sector write 612, ECS bias pulse segment 654 is shaped to prepare for the upcoming conditions of subsequent operations, such as (in this example) sector write 616. Unlike the sharp ramp up required during sector write 612 when laser 320 is activated, servo ID read 614 does not involve laser activation. Consequently, the ramp up of the ECS bias signal during servo ID read 614 is more gradual and reflects the reduced need to immediately counteract intense thermal transients. The shaping of ECS bias pulse segment 654 during servo ID read 614 is described by the following equation (2):

$$ECS(t2)=ECS(t1)+(ECS_{Bias}+ECS_{OS}-L(t1))*(1-\exp((t1-t2)/ECS_{GapTau})) \qquad (2)$$

In equation (2), L(t1) represents the level that ECS bias pulse segment 652 has decayed to at the end of the preceding sector write 612 (time t1) and serves as the starting point for the ramp up during servo ID read 614 to the level that ECS bias signal 650 needs to attain at the start of the following sector write 616 (time t2). $ECS_{GapTau}$ is a time constant governing the rate of ramp up of ECS bias pulse segment

654, where a larger $ECS_{GapTau}$ results in a slower ramp up and a smaller $ECS_{GapTau}$ produces a faster and sharper ramp up.

During sector write 616 following servo ID read 614, ECS bias pulse segment 656 begins at the elevated level ECS (t2) that was attained during servo ID read 614. As sector write 616 progresses, ECS bias pulse segment 656 decays exponentially to the baseline level $ECS_{Bias}$. The shaping of ECS bias pulse segment 656 during sector write 616 is described by the following equation (3):

$$ECS(t)=ECS_{Bias}+(ECS(t2)-ECS_{Bias})*\exp((t2-t)/EC-S_{Tau}) \qquad (3)$$

As time progresses during sector write 616, ECS pulse segment 656 decays exponentially in accordance with the time constant $ECS_{Tau}$, where a larger $ECS_{Tau}$ results in a slower decay that keeps ECS bias signal 650 elevated for a longer period, and a smaller $ECS_{Tau}$ results in a faster decay that brings ECS bias signal 650 closer to the baseline level more quickly. Thus, by appropriate programming of $ECS_{Bias}$ and $ECS_{Tau}$, ECS bias pulse segment 656 is fine tuned to match the NTS thermal response during sector write 616.

Shaping of ECS bias signal 650 continues during the subsequent operational phases 610 shown in FIG. 6 in a similar fashion. During servo ID read 618, ECS bias pulse segment 658 ramps up from the $ECS_{Bias}$ baseline level per the $ECS_{GapTau}$ setting to prepare for the upcoming sector write 620. During sector write 620, ECS bias pulse segment 660 decays, per the $ECS_{Tau}$ setting, from the elevated level attained during servo ID read 618 to the $ECS_{Bias}$ baseline level. During sector skip 622, ECS bias pulse segment 662 ramps up again to reach the appropriate level needed to counteract the NTS thermal transient during the upcoming sector write 624. During sector write 624, ECS bias pulse segment 664 begins from the elevated level attained during sector skip 622 and decays again per $ECS_{Tau}$ to the $ECS_{Bias}$ baseline level.

The exemplary operational phases 610 shown in FIG. 6 are just a few examples of operational phases during which ECS bias signal 650 is dynamically shaped to counteract the transient and steady-state thermal responses of the NTS sensor. This approach to shaping ECS bias signal 650 using programmable parameters such as $ECS_{Bias}$, $ECS_{OS}$, $ECS_{Tau}$, and $ECS_{GapTau}$ is not limited to the specific examples shown in FIG. 6, and can be applied to appropriately counteract the thermal response of NTS 332 during disk operations other than those illustrated in FIG. 6.

Figure 7A:
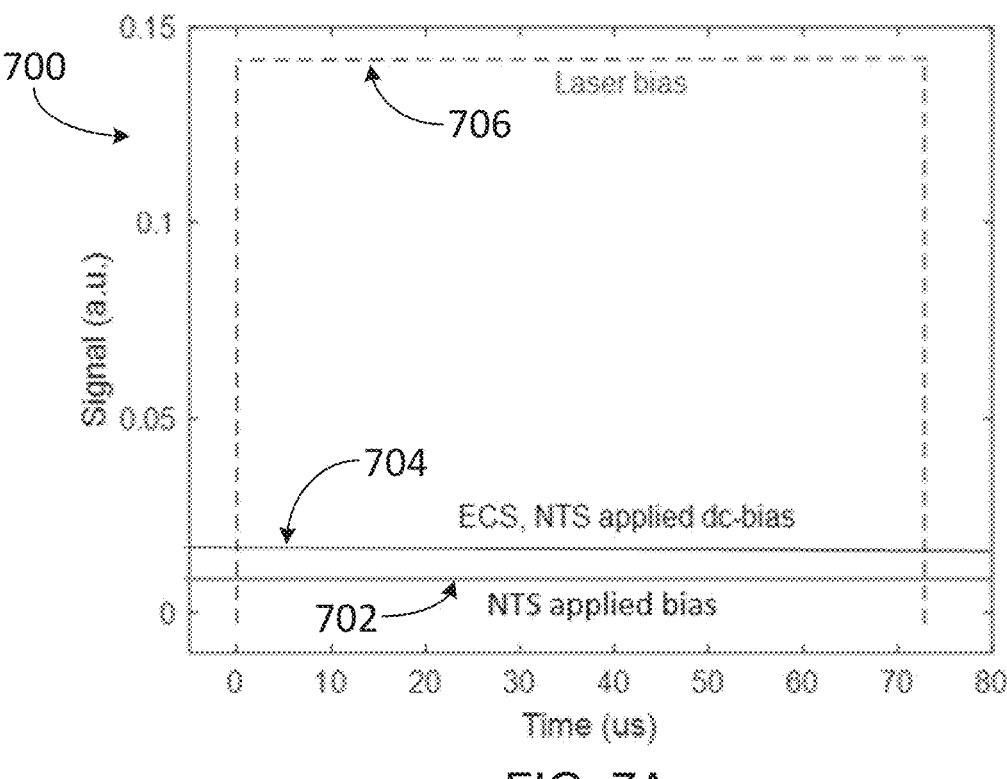
FIG. 7A is a graph illustrating constant bias signals applied to the ECS and NTS sensors, in accordance with aspects of this disclosure.
Figure 7B:
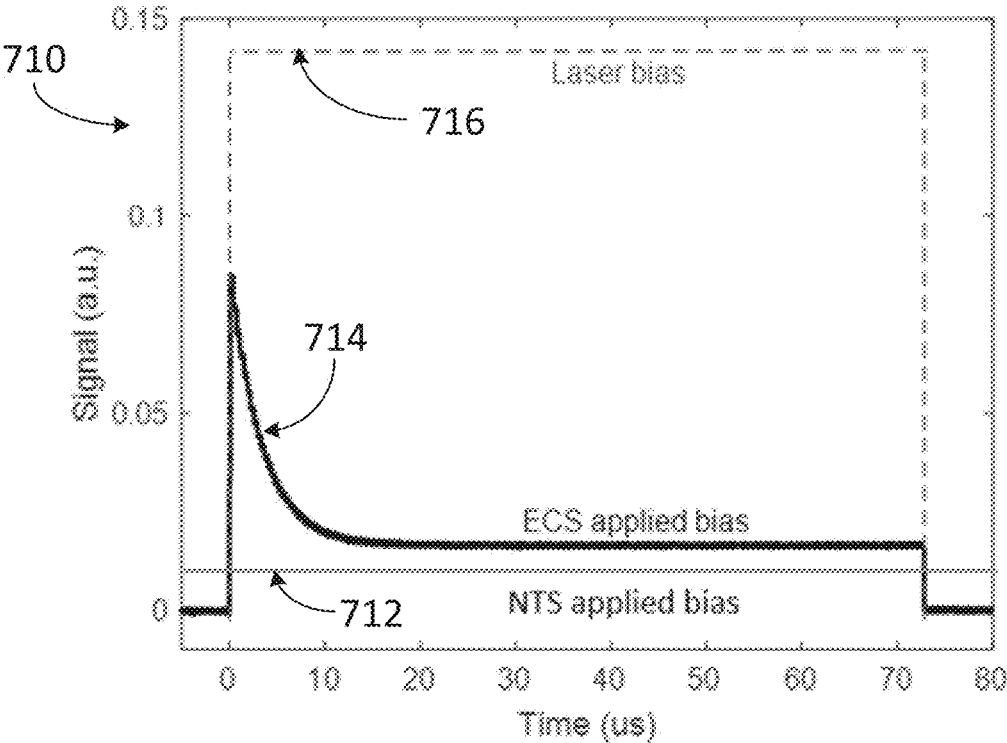
FIG. 7B is a graph illustrating a bias signal applied to the ECS sensor that is dynamically shaped to mirror and counteract the response of the NTS sensor during laser activation, in accordance with aspects of this disclosure.
Figure 7C:
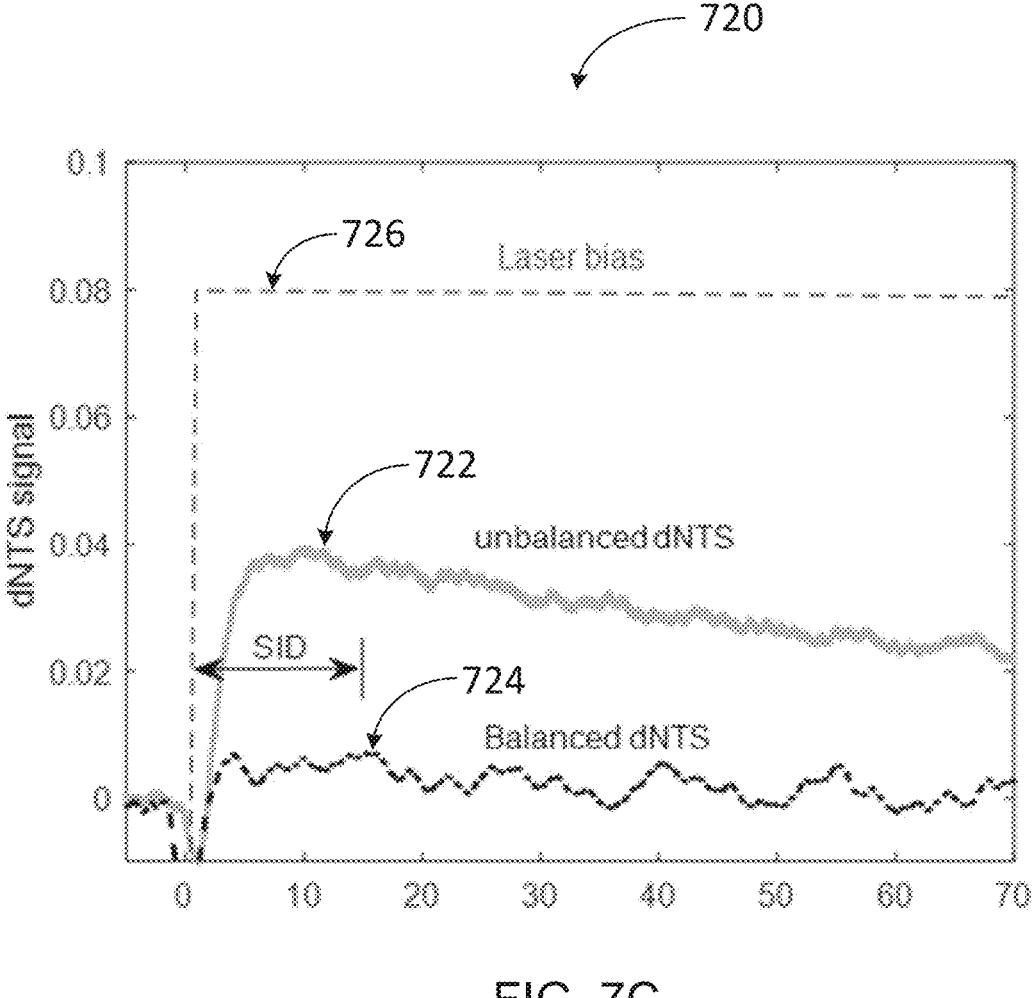
FIG. 7C is a graph illustrating the impact of the constant bias approach versus the dynamically shaped ECS bias approach on the dNTS signal, in accordance with aspects of this disclosure.

FIGS. 7A-7C illustrate the advantages of dynamically shaping the ECS bias signal as shown in FIG. 6 compared to a constant ECS bias signal approach. FIG. 7A is a graph 700 illustrating constant bias signals applied to the ECS and NTS sensors, in accordance with aspects of this disclosure. In particular, as shown in FIG. 7A, a constant NTS bias signal 702 and a constant ECS bias signal 704 (corresponding to NTS bias signal 432 and ECS bias signal 434 of FIG. 4) are respectively applied to NTS 332 and ECS 334 during activation of HAMR laser 320 (represented by laser bias signal 706).

FIG. 7B is a graph 710 illustrating a bias signal applied to the ECS sensor that is dynamically shaped to mirror and counteract the response of the NTS sensor during laser activation, in accordance with aspects of this disclosure. In particular, as shown in FIG. 7B, a constant NTS bias signal 712 is applied, but the ECS bias signal 714 is dynamically shaped as described in FIG. 6 to mirror and counteract the response of NTS 332 during laser activation (as indicated by laser bias signal 716). In particular, at laser activation, ECS bias signal 714 spikes to match the sharp thermal response of NTS 332, and then decays smoothly to the baseline ECS bias signal as the thermal environment stabilizes. Shaping of ECS bias signal 714 in this manner effectively nulls out the response of NTS 332 during both transient and steady-state phases, allowing temperature spikes due to laser mode hopping to stand out clearly and be more easily detected.

FIG. 7C is a graph 720 illustrating the impact of the constant bias approach versus the dynamically shaped ECS bias approach on the dNTS signal, in accordance with aspects of this disclosure. In particular, the dNTS signal 722 resulting from the constant bias approach (FIG. 7A) is unbalanced and exhibits a sharp, transient spike at laser activation (indicated by laser bias 726) and remains elevated and noisy due to the mismatch between the constant ECS bias and the transient NTS thermal response. This unbalanced dNTS signal 722 makes it difficult to detect smaller temperature transients or spikes associated with laser mode hopping. By contrast, the dNTS signal 724 resulting from the dynamically shaped ECS bias approach (FIG. 7B) remains close to zero throughout both the initial laser activation and steady-state phases. By maintaining a balanced dNTS signal 724 that is close to zero, temperature spikes caused by laser mode hopping are more prominent and more easily detectable.***

Figure 8A:
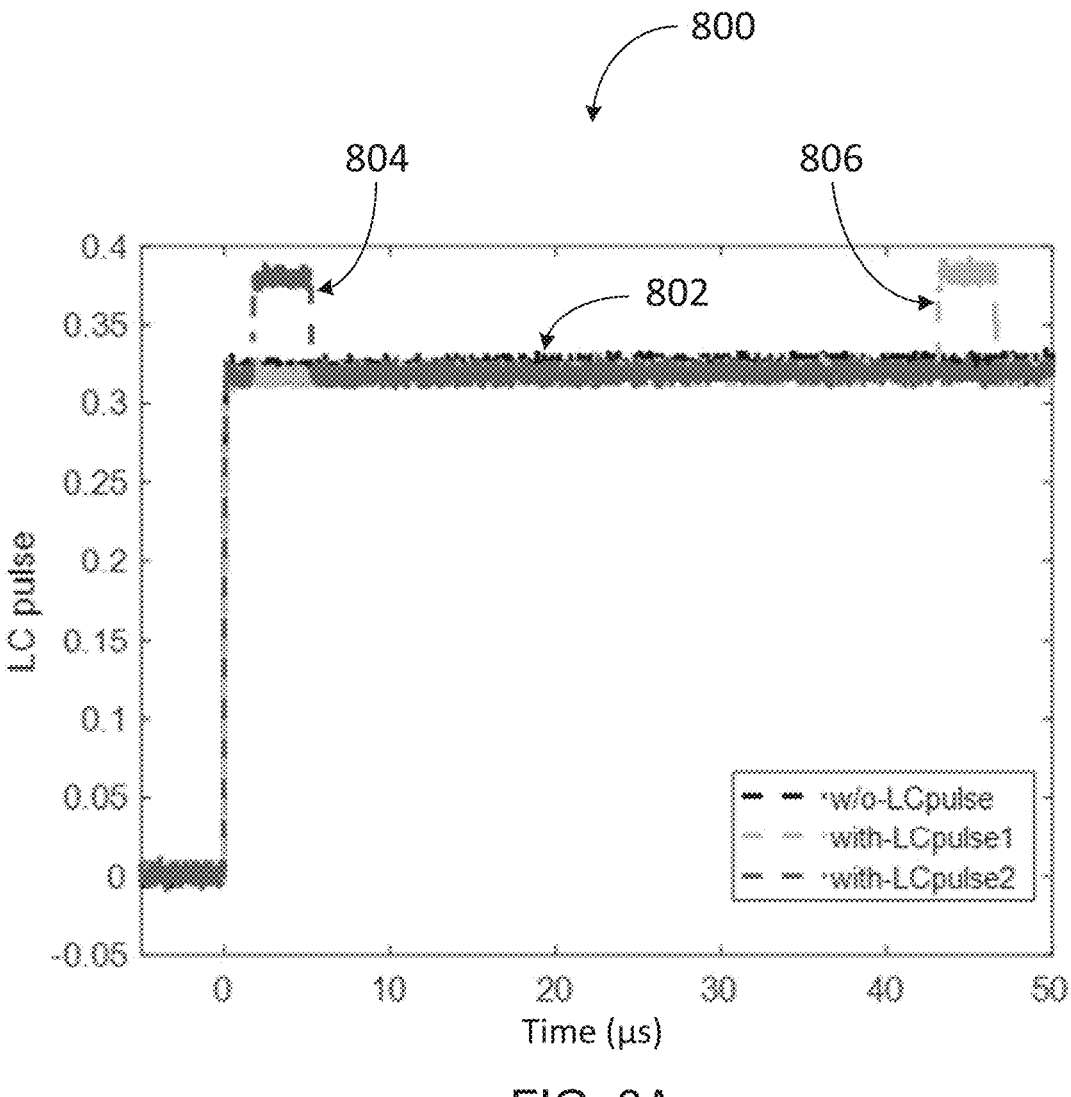
FIG. 8A is a graph showing examples of laser current pulses formed with intentional overshoots to mimic laser mode hopping, in accordance with aspects of this disclosure.
Figure 8B:
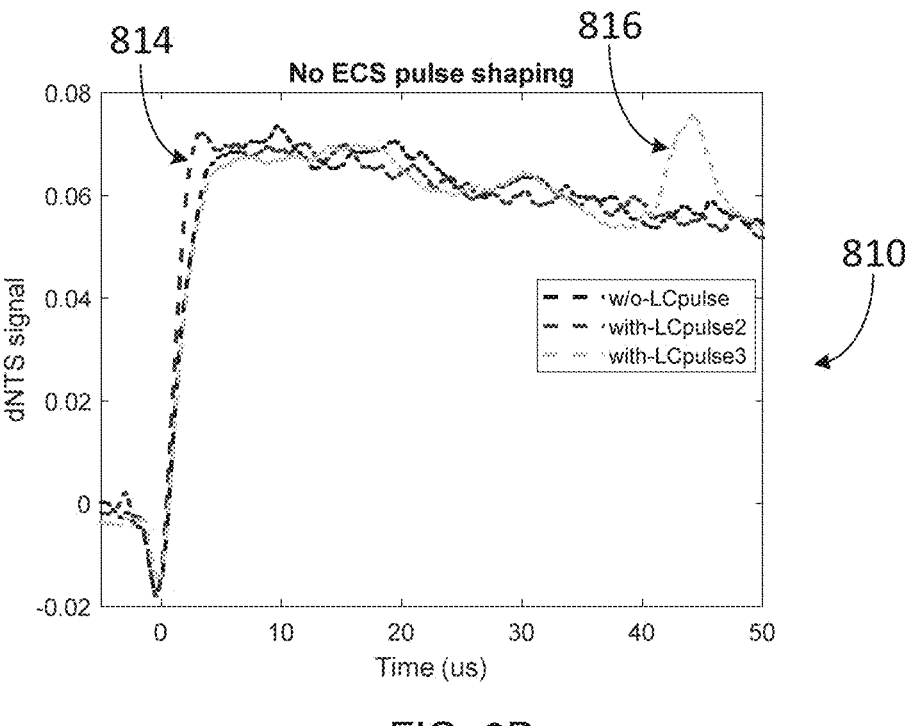
FIG. 8B is a graph showing unbalanced dNTS signals resulting from application of the laser current pulses of FIG. 8A when a constant ECS bias signal is applied, in accordance with aspects of this disclosure.
Figure 8C:
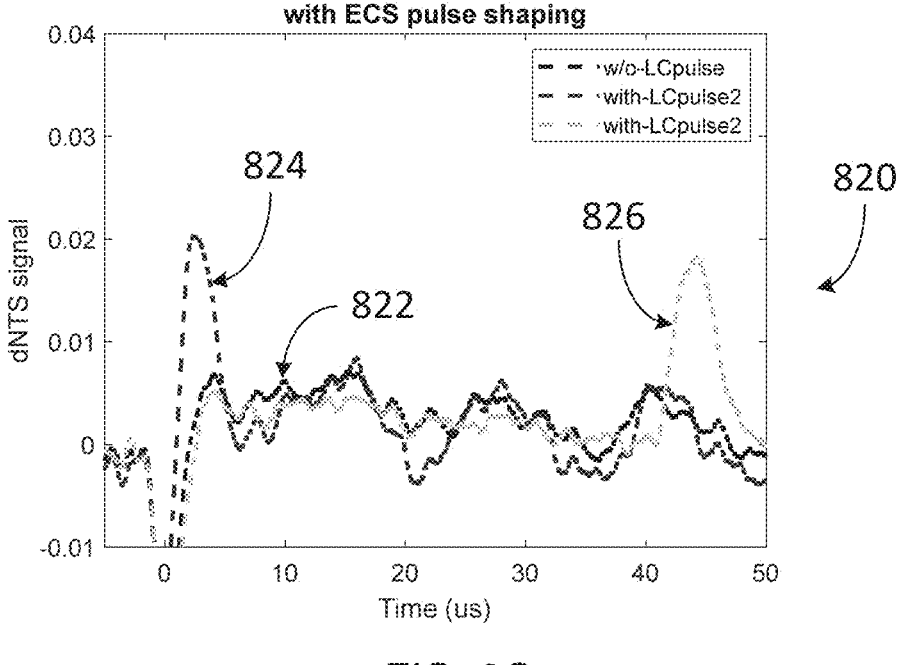
FIG. 8C is a graph showing balanced dNTS signals resulting from application of the laser current pulses of FIG. 8A when the ECS bias signal is shaped to mirror the NTS response, in accordance with aspects of this disclosure.

FIGS. 8A-8C illustrate the effectiveness of dynamically shaping the ECS bias signal to balance the dNTS signal for improved detection of laser power variations, including mode hops, during both transient and steady-state phases of laser operation. FIGS. 8A-8C demonstrate how ECS pulse shaping improves mode hop detection compared to the unbalanced dNTS signal resulting from application of a constant ECS bias signal.

FIG. 8A is a graph 800 showing examples of laser current pulses formed with intentional overshoots to mimic laser mode hopping, in accordance with aspects of this disclosure. Laser current pulse 802 is a standard laser current pulse without any intentional variations. Laser current pulse 804 includes an intentional overshoot introduced near the transient portion immediately following laser activation, intended to mimic a laser mode hop during the transient portion. Laser current pulse 806 includes an intentional overshoot introduced during the steady state portion after thermal conditions have stabilized following laser activation, intended to mimic a laser mode hop during steady state operation. Laser current profiles 802, 804, 806 allow evaluation of how the dNTS signal responds to mode hops occurring at different times during laser operation.

FIG. 8B is a graph 810 showing unbalanced dNTS signals 812, 814, 816 resulting from application of laser current pulses 802, 804, 806 of FIG. 8A when a constant ECS bias signal is applied (when the ECS bias signal is not dynamically shaped), in accordance with aspects of this disclosure. In particular, dNTS signal 812 is measured during application of standard laser current pulse 802 with no overshoots to mimic mode hops; dNTS signal 814 is measured during application of laser current pulse 804 with an overshoot to mimic a mode hop during the transient phase immediately following laser activation; and dNTS signal 816 is measured during application of laser current pulse 806 with an overshoot to mimic a mode hop during the steady state phase after thermal conditions have stabilized following laser activation. As can be seen in FIG. 8B, while mode hop (overshoot) 806 is prominent and can be detected in dNTS signal 816 in the steady-state phase after thermal conditions have stabilized, mode hop (overshoot) 804 is not prominent and cannot be reliably detected in dNTS signal 814 in the transient phase immediately following laser activation. Thus, when a constant ECS bias is applied, steady state mode hops may be detected but transient mode hops cannot be reliably detected. This limitation arises because the unbalanced dNTS signal is dominated by the sharp NTS thermal transient at laser activation, masking smaller temperature spikes caused by mode hops during this phase.

FIG. 8C is a graph 820 showing balanced dNTS signals 822, 824, 826 resulting from application of laser current pulses 802, 804, 806 of FIG. 8A when the ECS bias signal is dynamically shaped to mirror the NTS response, in accordance with aspects of this disclosure. In particular, dNTS signal 822 is measured during application of standard laser current pulse 802 with no overshoots to mimic mode hops; dNTS signal 824 is measured during application of laser current pulse 804 with an overshoot to mimic a mode hop during the transient phase immediately following laser activation; and dNTS signal 826 is measured during application of laser current pulse 806 with an overshoot to mimic a mode hop during the steady state phase after thermal conditions have stabilized following laser activation. As can be seen in FIG. 8C, mode hop (overshoot) 804 in the transient phase immediately following laser activation is prominent in balanced dNTS signal 824 and can be reliably detected, and mode hop (overshoot) 806 in the steady state phase after thermal conditions have stabilized is also prominent in dNTS signal 826 and can also be reliably detected. Thus, when the ECS bias signal is dynamically shaped to mirror the NTS response as described herein, the dNTS signal is balanced and clearly reflects mode hops occurring in both the transient and steady state phases. Importantly, the balanced dNTS signal no longer exhibits the masking effect seen in FIG. 8B, as the shaping of the ECS bias signal nullifies the dominant thermal transient from the NTS during laser activation.

The methods and flow diagrams disclosed herein are implemented by control circuitry 22, which may be implemented partially or wholly in one or more processing devices such as a PLSI, an integrated circuit (IC) such as a system-on-a-chip (SOC), arm electronics, and/or any other suitable circuitry or controller. Control circuitry 22 may further comprise a microprocessor executing instructions operable to perform the methods and flow diagrams described herein. The instructions may be stored in a computer-readable medium, such as a non-volatile semiconductor memory device that may be external to the microprocessor or integrated with the microprocessor in an SOC. The instructions may alternatively be stored on a disk and read into a volatile semiconductor memory when the HDD is powered on. Control circuitry 22 may comprise logic circuitry such as state machine circuitry or other suitable logic circuitry. The methods and flow diagrams disclosed herein may be implemented using analog circuitry, digital circuitry, or a combination thereof.

One or more processing devices may comprise control circuitry 22 and may perform, individually and/or collectively, some or all of the functions of control circuitry 22. Such processing devices may be part of the HDD and/or abstracted away from physically proximity to the HDD. Such processing devices may be part of or proximate to one or more unitary products, racks comprising multiple data storage devices, physical or virtual servers, local area networks, storage area networks, data centers, and/or cloud services. Disk drives or HDDs as disclosed herein may include magnetic, optical, hybrid, or other types of disk drives. Devices such as computing devices, data servers, media content storage devices, and other devices may comprise the storage media and control circuitry described herein.

While certain embodiments are described herein, these embodiments are presented by way of example only, and do not limit the scope of this disclosure. Various omissions, substitutions and changes may be made without departing from the spirit and scope of this disclosure. The methods and processes described herein are not limited to any particular sequence and may be used independently or combined in various ways. Some method or process steps may be omitted and other steps added in some implementations. Nothing in this description implies that any particular feature, component, characteristic, or step is necessary or indispensable. Many variations, modifications, additions, and improvements are possible and fall within the scope of this disclosure as defined by the following claims.

The invention claimed is:

1. A data storage device comprising:
   a disk;
   a recording head comprising a write thermal sensor configured in or adjacent to a write element, a read thermal sensor configured in or adjacent to a read element, and a laser configured for heat assisted magnetic recording (HAMR); and
   one or more processing devices or components, configured, alone or in combination, to shape a bias signal applied to the read thermal sensor to mirror a transient thermal response of the write thermal sensor during activation of the laser.

2. The data storage device of claim 1, wherein the one or more processing devices or components are further configured, alone or in combination, to generate a differential signal based on a difference between the transient thermal response of the write thermal sensor and a thermal response of the read thermal sensor.

3. The data storage device of claim 2, wherein the one or more processing devices or components are further configured, alone or in combination, to monitor the differential signal to detect mode hopping of the laser.

4. The data storage device of claim 2, wherein the one or more processing devices or components are further configured, alone or in combination, to detect mode hopping of the laser by detecting spikes in the differential signal.

5. The data storage device of claim 1, wherein the read thermal sensor is an embedded contact sensor (ECS) and the write thermal sensor is a near field temperature sensor (NTS).

6. The data storage device of claim 5, wherein during an initial sector write, the one or more processing devices or components are further configured, alone or in combination, to shape the bias signal applied to the read thermal sensor as $ECS(t)=ECS_{Bias}+ECS_{OS}*exp(-t/ECS_{Tau})$, where $ECS(t)$ is the bias signal, $ECS_{Bias}$ is a programmable baseline level for the bias signal, $ECS_{OS}$ is a programmable offset that counteracts a temperature spike in the transient thermal response of the write thermal sensor from laser activation, and $ECS_{Tau}$ is a programmable time constant that controls a rate of exponential decay of the bias signal.

7. The data storage device of claim 6, wherein during a servo identification data (ID) read, the one or more processing devices or components are further configured, alone or in combination, to shape the bias signal applied to the read thermal sensor as $ECS(t2)=ECS(t1)+ (ECS_{Bias}+ECS_{OS}-L(t1))*(1-exp((t1-t2)/ECS_{GapTau}))$, where t1 is a beginning of the servo ID read, t2 is an end of the servo ID read, and $ECS_{GapTau}$ is a time constant that controls a rate of exponential ramp up of the bias signal.

8. The data storage device of claim 7, wherein during a sector write following the servo ID read, the one or more processing devices or components are further configured, alone or in combination, to shape the bias signal applied to the read thermal sensor as $ECS(t)=ECS_{Bias}+ (ECS (t2)-ECS_{Bias})*exp((t2-t)/ECS_{Tau})$.

9. A method for detecting laser mode hopping in a data storage device, the method comprising:
   shaping a bias signal applied to a read thermal sensor configured in a recording head of the data storage device to mirror a thermal response of a write thermal sensor configured in the recording head during operation of a laser configured for heat assisted magnetic recording (HAMR);
   generating a differential signal based on a difference between the thermal response of the write thermal sensor and a thermal response of the read thermal sensor; and
   monitoring the differential signal to detect laser mode hopping.

10. The method of claim 9, further comprising detecting spikes in the differential signal to detect laser mode hopping.

11. The method of claim 9, further comprising shaping the bias signal applied to the read thermal sensor during an initial sector write as $ECS(t)=ECS_{Bias}+ECS_{OS}*exp(-t/ECS_{Tau})$, where $ECS(t)$ is the bias signal, $ECS_{Bias}$ is a programmable baseline level for the bias signal, $ECS_{OS}$ is a programmable offset that counteracts a temperature spike in the thermal response of the write thermal sensor from laser activation, and $ECS_{Tau}$ is a programmable time constant that controls a rate of exponential decay of the bias signal.

12. The method of claim 11, further comprising shaping the bias signal applied to the read thermal sensor during a servo ID read as $ECS (t2)=ECS(t1)+ (ECS_{Bias}+ECS_{OS}-L(t1))*(1-exp((t1-t2)/ECS_{GapTau}))$, where t1 is a beginning of the servo ID read, t2 is an end of the servo ID read, and $ECS_{GapTau}$ is a time constant that controls a rate of exponential ramp up of the bias signal.

13. The method of claim 12, further comprising shaping the bias signal applied to the read thermal sensor during a sector write following the servo ID read as $ECS(t)=ECS_{Bias}+ (ECS(t2)-ECS_{Bias})*exp((t2-t)/ECS_{Tau})$.

14. Control circuitry for controlling a recording head of a data storage device, the recording head comprising a write thermal sensor configured in a write element, a read thermal sensor configured in a read element, and a laser configured for heat assisted magnetic recording (HAMR),
   the control circuitry being configured to shape a bias signal applied to the read thermal sensor to mirror a transient thermal response of the write thermal sensor during activation of the laser.

15. The control circuitry of claim 14, wherein the control circuitry is further configured to generate a differential signal based on a difference between the transient thermal response of the write thermal sensor and a thermal response of the read thermal sensor.

16. The control circuitry of claim 15, wherein the control circuitry is further configured to monitor the differential signal to detect mode hopping of the laser.

17. The control circuitry of claim 15, wherein the control circuitry is further configured to detect mode hopping of the laser by detecting spikes in the differential signal.

18. The data storage device of claim 5, wherein during an initial sector write, the one or more processing devices or components are further configured, alone or in combination, to shape the bias signal applied to the read thermal sensor based on one or more of a programmable baseline level for the bias signal, a programmable offset that counteracts a temperature spike in the transient thermal response of the write thermal sensor from laser activation, and a programmable time constant that controls a rate of exponential decay of the bias signal.

19. The data storage device of claim 18, wherein during a servo identification data (ID) read, the one or more processing devices or components are further configured, alone or in combination, to shape the bias signal applied to the read thermal sensor based on the programmable baseline level for the bias signal, the programmable offset that counteracts the temperature spike in the transient thermal response of the write thermal sensor from laser activation, and a programmable time constant that controls a rate of exponential ramp up of the bias signal.

20. The data storage device of claim 19, wherein during a sector write following the servo ID read, the one or more processing devices or components are further configured, alone or in combination, to shape the bias signal applied to the read thermal sensor based on the programmable baseline level for the bias signal and the programmable time constant that controls the rate of exponential decay of the bias signal.

* * * * *